United States Patent [19]
Komizo et al.

[11] Patent Number: 4,997,539
[45] Date of Patent: Mar. 5, 1991

[54] METHOD AND APPARATUS FOR PRODUCING A MAGNETIC RECORDING MEDIUM

[75] Inventors: Kazunaga Komizo; Masatoshi Ichikawa; Takeshi Sakuma, all of Kurashiki; Fumiaki Yokoyama, Yokohama; Yukio Yamaguchi, Kawasaki, all of Japan

[73] Assignee: Mitsubishi Kasei Corporation, Tokyo, Japan

[21] Appl. No.: 378,963

[22] Filed: Jul. 12, 1989

[30] Foreign Application Priority Data

Jul. 15, 1988 [JP] Japan .................. 63-176255
Dec. 16, 1988 [JP] Japan .................. 63-317704
Dec. 16, 1988 [JP] Japan .................. 63-317708

[51] Int. Cl.$^5$ ................................ C23C 14/34
[52] U.S. Cl. ................. 204/192.2; 204/298.06
[58] Field of Search ......... 204/192.2, 298 TT, 298.06

[56] References Cited

U.S. PATENT DOCUMENTS

| | | | |
|---|---|---|---|
| 3,410,775 | 11/1968 | Vratny | 204/192.12 |
| 4,094,764 | 6/1978 | Boucher et al. | 204/298 TT |
| 4,412,907 | 11/1983 | Ito et al. | 204/298 |
| 4,427,524 | 1/1984 | Crombeen et al. | 204/298 TT |
| 4,784,739 | 11/1988 | Kadokura et al. | 204/192.2 |

FOREIGN PATENT DOCUMENTS 59-16975  1/1984  Japan .................. 204/298 TT

OTHER PUBLICATIONS

IBM Tech. Disc. Bull., vol. 12, No. 11, Apr. 1970, p. 1809.
Solid State Technology/Mar., 1988, pp. 106–112.
Patent Abstracts of Japan, vol. 12, no. 309 (P-748), Aug. 23, 1989; and JP-A-63 079 233 (Fuji Electric Co.); 04/09/88.
Thin Solid Films, vol. 118, no. 2, Aug. 1984, pgs 129–138; S. Kolbayashi et al., "High Rate Deposition of MoSi$_2$ Films by Selective Cosputtering."

Primary Examiner—Aaron Weisstuch
Attorney, Agent, or Firm—Oblon, Spivak, McClelland, Maier & Neustadt

[57] ABSTRACT

A method for producing a magnetic recording medium, which comprises forming, by sputtering, a thin undercoating layer and a thin cobalt alloy magnetic layer sequentially on a substrate, wherein an intermediate electrode is provided in the vicinity of the target to enclose at least ½ of the circumference of the sputter erosion end of the target, and at least one of the undercoating layer and the cobalt alloy magnetic layer is formed under such condition that a positive potential relative to the substrate and the grounded portion of the main body of the layer-forming apparatus, is applied to the intermediate electrode.

19 Claims, 8 Drawing Sheets

METHOD AND APPARATUS FOR PRODUCING A MAGNETIC RECORDING MEDIUM

BACKGROUND OF THE INVENTION

The present invention relates to a method and apparatus for producing a magnetic recording medium. Particularly, it relates to a method and apparatus for producing a magnetic recording medium having a high coercive force.

In recent years, coupled with the progress in information treating techniques including computers, the level of requirements for high density recording has increased with respect to magnetic recording media such as magnetic disks used for external memory devices thereof.

At present, it is common to employ a thin cobalt alloy layer formed epitaxially on a thin chromium undercoating layer by sputtering, as a magnetic layer for a magnetic recording medium used as a longitudinal recording magnetic disk. With this thin cobalt alloy magnetic layer, it is necessary to impart a high coercive force as a magnetic property required for the high density recording. A number of reports have been made on such property (e.g. "New longitudinal recording media $Co_x Ni_y Cr_z$ from high rate static magnetron sputtering system", IEEE Trans. Magn., Mag-22, No. 5, (1986), 334; Japanese Unexamined Patent Publication No. 79233/1988; Japanese Unexamined Patent Publication No. 79968/1988).

As stated in such reports, the coercive force of a thin cobalt alloy magnetic layer increases with the thickness of the chromium undercoating layer. However, when the thickness exceeds a certain upper limit value, the coercive force shows a saturation characteristic, and it becomes difficult to further increase the coercive force. For example, Japanese Unexamined Patent Publication No. 79968/1988 teaches that when the thickness of a thin chromium undercoating layer exceeds 1,500 Å, a saturation tendency is observed such that the coercive force of the magnetic layer no longer increases, and when the thickness of the undercoating layer is less than 1,500 Å, the coercive force tends to be remarkably low at a practically useless level.

Further, the coercive force increases with a reduction of the thickness of the thin cobalt alloy layer. However, the reduction of the thickness of the cobalt alloy layer leads to a decrease in the production output, and it is difficult to practically reduce the thickness beyond a certain level. Furthermore, the coercive force may be increased to some extent by selecting the sputtering conditions such as the pressure of the gas for forming or the substrate temperature during the formation of the magnetic layer, but such improvement is limited.

It is also known to improve the coercive force of the magnetic layer by conducting sputtering under such a condition that a negative bias voltage is applied to the substrate (The 35th Lecture Meeting of Applied Physics Association, Spring 1988, 29a-c-9,10). However, in a continuous layer-forming apparatus wherein the substrate moves, it is necessary to apply a negative potential to the moving substrate, and as a result the apparatus is complicated. Besides, it is necessary to apply the negative potential over a wide area i.e. not only in the vicinity of the target. Therefore, it is possible that an abnormal electric discharge will take place, which in turn leads to damage to the layer-forming apparatus. Thus, this method has various problems as an industrial layer-forming method.

SUMMARY OF THE INVENTION

It is therefore an object of the present invention to solve the above-mentioned conventional problems and to provide a method for producing a magnetic recording medium having a remarkably high coercive force.

Under these circumstance, the present inventors have conducted extensive research to improve the coercive force of the magnetic recording medium. As a result, they have discovered that the coercive force of the magnetic recording medium can be remarkably improved by providing an intermediate electrode in the vicinity of the circumference of the target and forming a thin undercoating layer and/or a thin metal magnetic layer on a substrate by sputtering while applying a positive potential to the intermediate electrode relative to the grounded portion of the main body of the layer-forming apparatus. The present invention has been accomplished on the basis of this discovery.

The present invention provides a method for producing a magnetic recording medium, which comprises forming, by sputtering, a thin undercoating layer and a thin cobalt alloy magnetic layer sequentially on a substrate, wherein an intermediate electrode is provided in the vicinity of the target to enclose at least ½ of the circumference of the sputter erosion end of the target, and at least one of the undercoating layer and the cobalt alloy magnetic layer is formed under such condition that a positive potential relative to the substrate and the grounded portion of the main body of the layer-forming apparatus, is applied to the intermediate electrode.

The present invention also provides a sputtering apparatus for forming a thin layer on a substrate by sputtering, which comprises an intermediate electrode disposed in the vicinity of a target provided to face the substrate and having a shape to enclose at least ½ of the circumference of the sputter erosion end of the target and a power source to apply a positive potential to the intermediate electrode.

DETAILED DESCRIPTION OF THE PREFERRED EMBODIMENTS

As the substrate for the present invention, a disk substrate made of a metal, particularly aluminum or an aluminum alloy, is usually employed. Further, it is usual to employ a disk substrate prepared by processing an aluminum substrate to a prescribed thickness, then treating the surface for specular finish, forming a first undercoating layer of a hard non-magnetic metal such as a Ni-P alloy by electroless plating or by anodic oxidation treatment, and then sputtering chromium as a second undercoating layer. It is also possible to employ a substrate prepared by sputtering chromium as an undercoating layer directly on an aluminum substrate treated for specular finish without forming the above-mentioned first undercoating layer.

There is no particular restriction as to the sputtering condition for forming the chromium undercoating layer. It is possible to employ sputtering conditions commonly used for forming a typical chromium undercoating layer or sputtering conditions as described hereinafter for the formation of a thin magnetic layer. The thickness of the chromium undercoating layer is usually within a range of from 1,000 to 3,000 Å in view of the relation to the coercive force of the magnetic layer. However, when the magnetic layer is made of a Co-Cr-Ta alloy, a high coercive force can be obtained even when the thickness of the chromium undercoating layer is less than 1,000 Å, and in this case, the thickness may be within a range of from 50 to 1,000 Å.

In the present invention, the thin chromium undercoating layer and/or the thin cobalt alloy magnetic layer is formed on the substrate by sputtering under the specific condition.

Now, the method for forming this thin layer will be described in detail with reference to the drawings.

Figure 1:
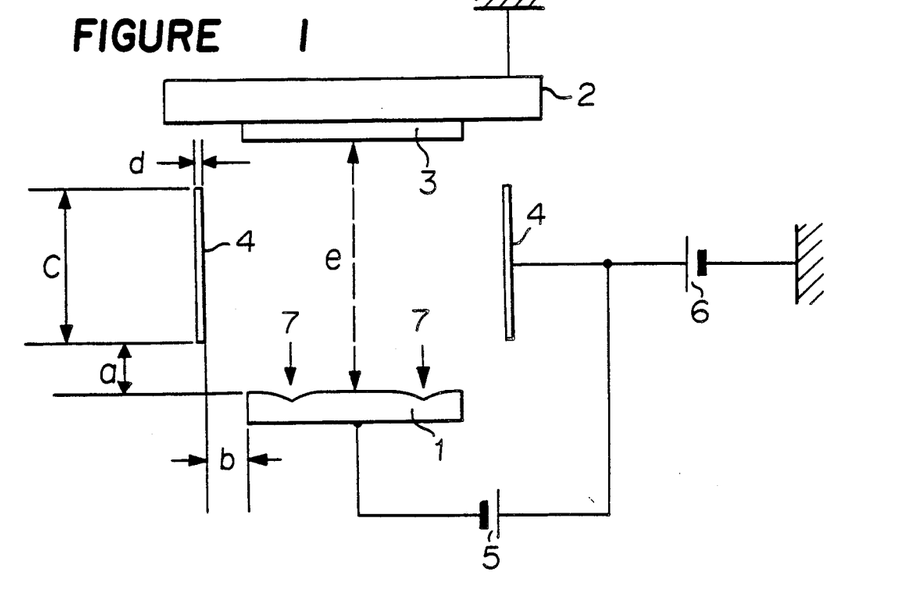
FIG. 1 is a diagrammatical view illustrating one embodiment of the sputtering apparatus of the present invention.

FIG. 1 is a diagrammatical view illustrating an embodiment of the sputtering apparatus of the present invention. In this Figure, reference numeral 1 indicates a target, and a substrate holder 2 is provided to face the target 1. A substrate 3 is mounted on the substrate holder 2. The substrate holder 2 is movable so that the substrate 3 can be continuously subjected to the layer-forming operation. An intermediate electrode 4 is disposed in a shape to enclose the space for sputtering discharge between this target 1 and the substrate 2, more particularly, in a shape to enclose at least ½ of the circumference of the sputter erosion end of the target 1 in the vicinity of the target 1. Numeral 5 indicates a power source for sputtering, which is connected to the target 1 and the intermediate electrode 4. Numeral 6 indicates a power source for the intermediate electrode, which is connected to the grounded portion of the main body of the layer-forming apparatus and the intermediate electrode 4. Numeral 7 indicates the sputter erosion portion of the target 1.

The sputtering power source 5 and the intermediate electrode power source 6 are preferably direct current power sources. However, RF power sources may also be employed. As the sputtering apparatus, a usual DC magnetron sputtering apparatus or RF magnetron sputtering apparatus may be employed.

Figure 2:
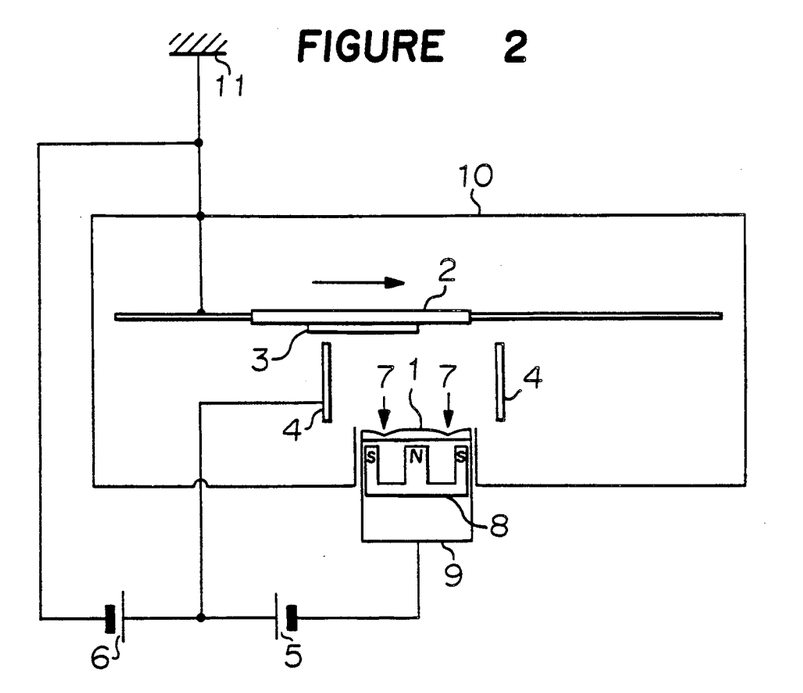
FIG. 2 is a detailed view of the embodiment shown in FIG. 1.
Figure 3A:
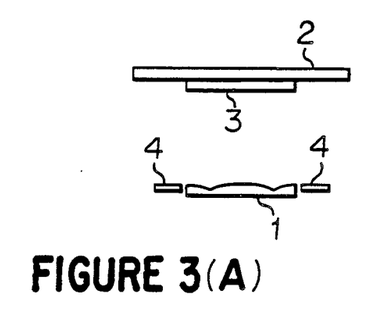
FIGS. 3(A) to 3(F) are cross sectional views illustrating the positions and shapes of intermediate electrodes.
Figure 3B:
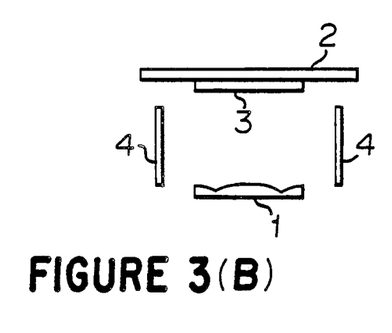
Figure 3C:
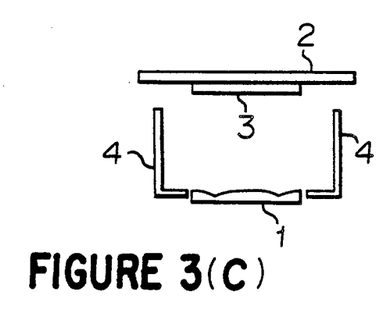
Figure 3D:
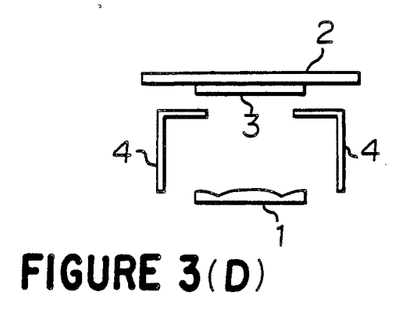
Figure 3E:
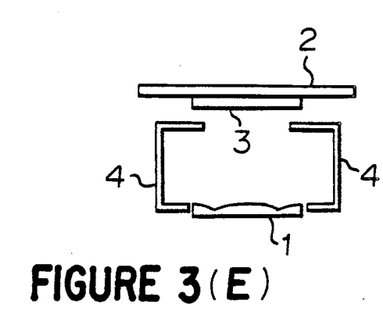
Figure 3F:
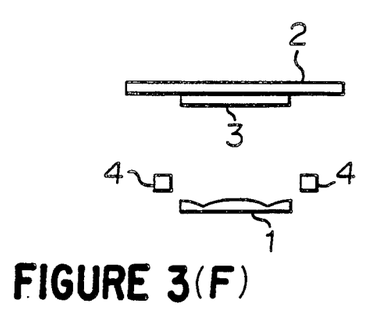

FIG. 2 is a detailed view of the sputtering apparatus of FIG. 1.

Numeral 8 indicates a magnet for a DC magnetron, numeral 9 a cathode of the DC magnetron, numeral 10 the main body of the layer-forming apparatus, and numeral 11 the grounded portion of the main body 10 of the layer-forming apparatus.

FIGS. 3(A) to 3(F) are cross sectional views illustrating the positions and shapes of intermediate electrodes 4 of the present invention. In each FIG. the electrode 4 is in a shape to enclose at least ½ of the circumference of the sputter erosion end of the target 1.

Preferably, at least a part of the intermediate electrode 4 is located between a position distanced by ½, preferably ¼, of the distance between the surface of the target 1 and the surface of the substrate 3, from the surface of the target 1 in a direction towards the substrate 3, and a position distanced by 30 mm, preferably 20 mm, from the surface of the target 1 in a direction away from the substrate 3. Further, the intermediate electrode 4 is located between the circumference of the sputter erosion end of the target and a position distanced by 200 mm, preferably 150 mm, more preferably 120 mm, from said circumference outwardly in the plane of the target 1, in a shape to enclose at least ½ of the circumference of the sputter erosion end of the target 1, preferably the entire circumference of the target 1. It is particularly preferred that the intermediate electrode 4 is located between a position distanced by 30 mm from the surface of the target 1 in a direction towards the substrate 3 and a position distanced by 20 mm from the surface of the target 1 in a direction away from the substrate 3, and between the circumference of the target 1 and a position distanced by 120 mm from said circumference outwardly in the plane of the target 1 in a shape to enclose the entire circumference of the target.

If the location of the intermediate electrode 4 is outside the above ranges, the effects for improving the coercive force of the magnetic recording medium tend to be low.

As the shape of the intermediate electrode 4, a shape to enclose at least ½ of the circumference of the target 1, such as a ring shape, a cylindrical shape or a sheet shape, is employed. If the intermediate electrode encloses less than ½ of the circumference of the target 1, the effects for improving the coercive force tend to be low, such being undesirable.

The intermediate electrode 4 is usually made of a metal such as stainless steel, aluminum or copper.

Here, the sputter erosion end of the target 1 means the boundary between the sputtered area (sputter erosion portion) and the non-sputtered area when the surface of the target has been sputtered. For the purpose of the present invention, the circumference of this boundary is defined as the circumference of the sputter erosion end of the target. In a case of a flat plate target, the sputter erosion portion will have a ring shape having an inner circumference and an outer circumference. This outer circumference is regarded as the circumference of the sputter erosion end of the target in the present invention. The position of the sputter erosion end is determined by the size of the target and the position of the magnet for magnetron. In a case of a sputtering apparatus wherein the surface of the target is covered with a shield plate, the position of the sputter erosion end is determined by the size of such shield plate.

As the target 1, a cobalt alloy containing cobalt as the main component such as Co-Cr, Co-Cr-X, Co-Ni-X, Co W-X, wherein X is at least one element selected from the group consisting of Li, Si, B, Ca, Ti, V, Cr, Ni, As, Y, Zr, Nb, Mo, Ru, Rh, Ag, Sb, Hf, Ta, W, Re, Os, Ir, Pt, Au, La, Ce, Pr, Nd, Pm, Sm and Eu, may be employed.

As such target 1, an alloy comprising Co as the main component and Cr and Ta, is preferably employed. This Co-Cr-Ta alloy preferably comprises from 70 to 95 atomic % of Co, from 5 to 20 atomic % of Cr and from 0.1 to 10 atomic % of Ta.

To produce a magnetic recording medium in accordance with the method of the present invention by means of the sputtering apparatus as shown in FIG. 1, firstly the above-mentioned substrate 3 is attached to the substrate holder 2 of the apparatus, and then sputtering is conducted by using the above-mentioned Cr or Co alloy target 1 in the presence of a rare gas such as argon (Ar). In such case, sputtering is conducted under such condition that a positive potential relative to the substrate and the grounded portion of the main body of the sputtering apparatus, for example, a voltage of at most 1,000 V, preferably from 50 to 500 V, more preferably from 100 to 400 V, is applied to the intermediate electrode 4, to form a thin chromium undercoating layer or a thin cobalt alloy magnetic layer on the substrate 3.

In the present invention, the sputtering conditions may be those commonly employed for forming a magnetic layer of a magnetic recording medium. For example, sputtering can be conducted under such conditions that the pressure inside the evacuated chamber (background pressure) is at most $1 \times 10^{-6}$ Torr, the pressure of a rare gas such as argon is from $0.5 \times 10^{-3}$ to $2 \times 10^{-2}$ Torr, preferably from $1 \times 10^{-3}$ to $5 \times 10^{-3}$ Torr, and the substrate temperature is at least 150° C., preferably from 200 to 300° C.

The thickness of the thin magnetic alloy layer formed by such sputtering is preferably at such a level that the product (Br·t) of the residual magnetic flux density (Br) and the thickness (t) of the thin magnetic alloy layer 15 is from 300 to 700 G·μm.

FIGS. 4 to 13 are diagrammatical and detailed views of other embodiments of the sputtering apparatus suitable for the operation of the present invention.

Figure 14:
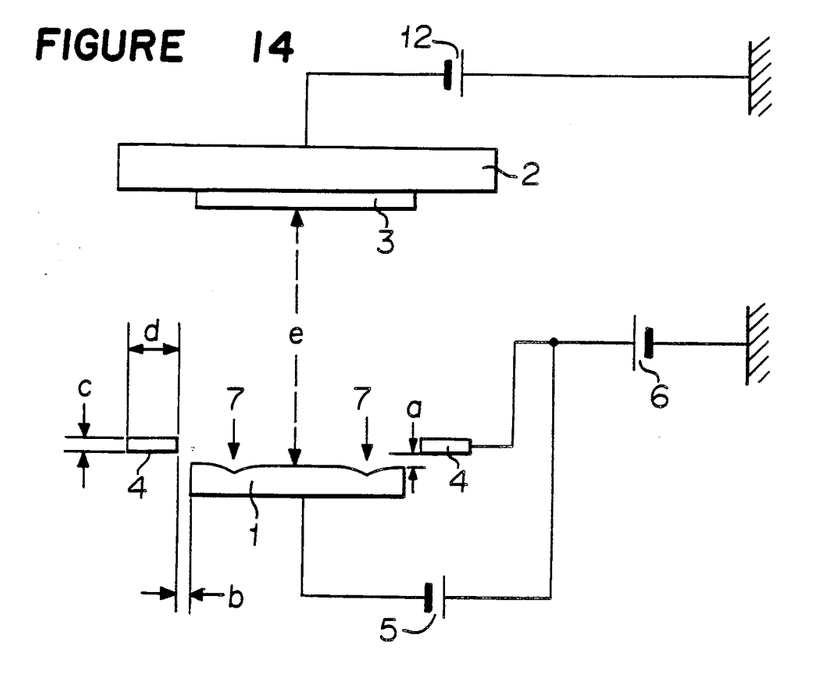
Figure 15:
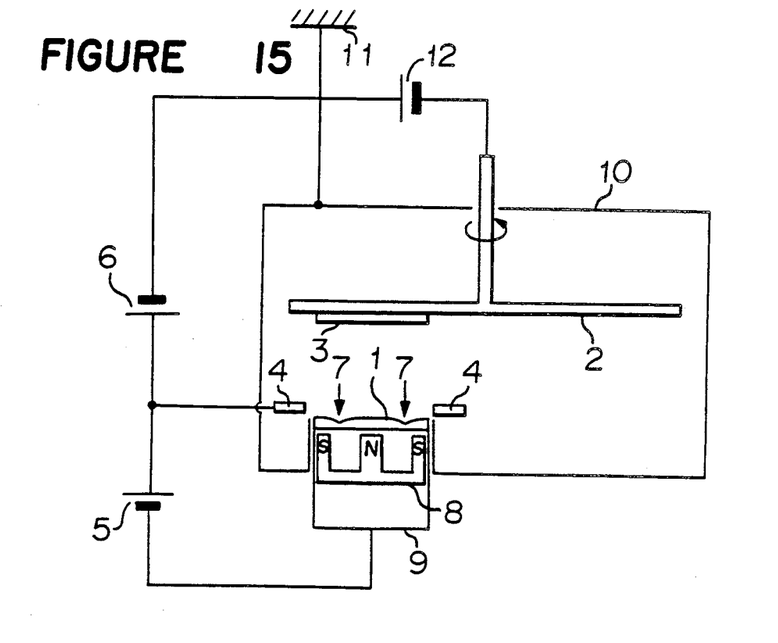

FIGS. 14 and 15 are diagrammatical and detailed views illustrating still another embodiment of the sputtering apparatus useful for the operation of the present invention, in which reference numeral 12 is a bias power source to apply a negative bias voltage to the substrate holder 2.

To produce a magnetic recording medium in accordance with the method of the present invention by means of the sputtering apparatus as shown in FIGS. 14 and 15, firstly, the above-mentioned substrate 3 is mounted on the substrate holder 2, and sputtering is conducted by using the above-mentioned chromium or cobalt alloy target 1 in the presence of a rare gas such as Ar. In such case, sputtering is conducted under such condition that a positive potential relative to the substrate and the grounded portion of the main body of the sputtering apparatus, for example, a potential of at most 1,000 V, preferably from 50 to 500 V, more preferably from 100 to 400 V, is applied to the intermediate electrode 4. More preferably, sputtering is conducted such that a negative bias voltage is applied to the substrate holder 2, i.e. a voltage of e.g. at most $-1,000$ V, preferably from $-50$ to $-500$ V, more preferably from $-100$ to $-400$ V, is applied to the substrate holder 2 by the bias power source 12, to form a thin chromium undercoating layer or a thin cobalt alloy magnetic layer on the substrate 3.

A high performance magnetic layer having a high coercive force is obtained by the thin magnetic metal layer of a cobalt alloy formed by sputtering under such condition that the intermediate electrode is provided in the vicinity of the circumference of the target and a positive potential relative to the substrate and the grounded portion of the main body of the layer-forming apparatus is applied to the intermediate electrode.

Now, the present invention will be described in further detail with reference to Examples and Comparative Examples. However, it should be understood that the present invention is by no means restricted to such specific Examples.

In the following Examples and Comparative Examples, symbols a to e are used to identify the position and the shape of the intermediate electrode as shown in FIGS. In the FIGS., b indicates the distance from the circumference of the target to the intermediate electrode. However, in the following Examples and Comparative Examples, the sputter erosion end of the target and the circumference of the target are the same, and b therefore indicates the distance from the circumference of the sputter erosion end of the target to the intermediate electrode.

In the apparatus used in Examples 1 to 49 (FIGS. 1 and 2 and FIGS. 4 to 13), the substrate holder 2 is grounded via the main body 10 of the layer-forming apparatus.

EXAMPLES 1 TO 7 AND COMPARATIVE EXAMPLE 1

By means of the apparatus as shown in FIGS. 1 and 2, sputtering was conducted by using an aluminum substrate 3 having a thin chromium layer (thickness: 1,000 Å) as the undercoating layer and a Co-Cr-Ta alloy target 1 under such condition that a positive potential (as identified in Table 1) relative to the substrate was applied to the intermediate electrode 4 in the presence of Ar gas at a background pressure of at most $1 \times 10^{-6}$ Torr, at an argon gas pressure of $4 \times 10^{-3}$ Torr and at a substrate temperature of 210° C., to form an 86 atomic % Co-12 atomic % Cr-2 atomic % Ta magnetic layer (400 G·μm) on the substrate.

The coercive force of the magnetic disk thus obtained was measured by a sample vibrating type magnetometer, and the results are shown in Table 1.

From these Examples, it has been found that when sputtering is conducted under such condition that a positive potential relative to the substrate is applied to the intermediate electrode, the coercive force of the magnetic disk thereby obtained is substantially improved.

Referring to FIGS. 1 and 2, the position and the shape of the intermediate electrode were as follows:
a=15 mm, b=50 mm, c=52 mm, d=3 mm, e=83 mm, Shape: a shape to enclose the entire circumference of the target.

TABLE 1

|  | Potential applied to intermediate electrode (V) | Coercive force (Oe) | Br·t (G·μm) |
| --- | --- | --- | --- |
| Comparative Example 1 | 0 | 798 | 400 |
| Example 1 | 50 | 818 | 400 |
| Example 2 | 100 | 870 | 400 |
| Example 3 | 150 | 972 | 400 |
| Example 4 | 200 | 1038 | 400 |
| Example 5 | 250 | 1130 | 400 |
| Example 6 | 300 | 1199 | 400 |
| Example 7 | 350 | 1234 | 400 |

EXAMPLES 8 TO 12 AND COMPARATIVE EXAMPLE 2

Figure 4:
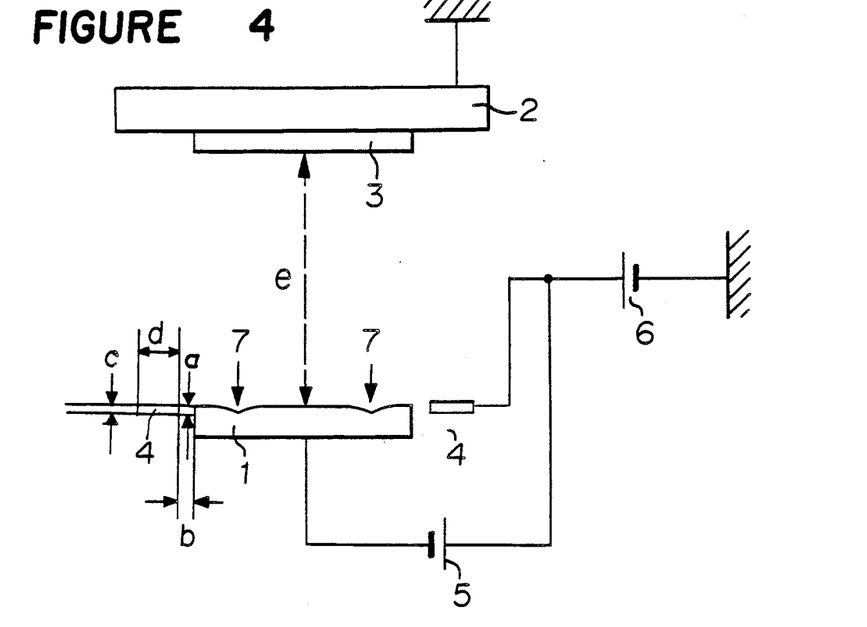
FIGS. 4 to 15 are diagrammatical and detailed views illustrating other embodiments of the sputtering apparatus useful for the operation of the present invention.
Figure 5:
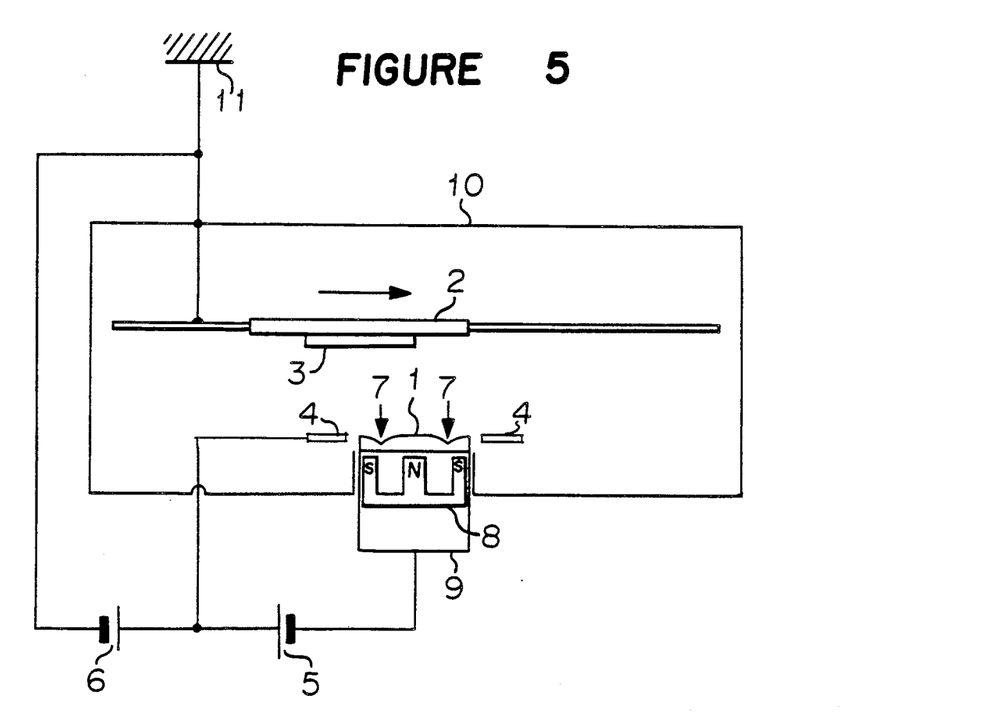

By means of the apparatus as shown in FIGS. 4 and 5, sputtering was conducted by using an aluminum substrate 3 having a thin chromium layer (thickness: 1,000 Å) formed as the undercoating layer by sputtering and a Co-Cr-Ta alloy target 1 under such condition that a potential (as identified in Table 2) relative to the substrate 3 was applied to the intermediate electrode 4 at a background pressure of at most $1 \times 10^{-6}$ Torr, at an argon gas pressure of $2 \times 10^{-3}$ Torr and at a substrate temperature of 250° C., to form an 86 atomic % Co-12 atomic % Cr-2 atomic % Ta magnetic layer (550 G·μm) on the substrate.

The coercive force of the magnetic disk thus obtained was measured by a sample vibrating type magnetometer, and the results are shown in Table 2.

Referring to FIGS. 4 and 5, the position and the shape of the intermediate electrode were as follows:
 a=3 mm, b=5 mm, c=3 mm, d=43 mm, e=83 mm,
Shape: a shape to enclose the entire circumference of the target.

TABLE 2

|  | Magnetic layer | Voltage applied to intermediate electrode (V) | Coercive force (Oe) |
| --- | --- | --- | --- |
| Comparative Example 2 | Co$_{86}$—Cr$_{12}$—Ta$_2$ | 0 | 950 |
| Example 8 | " | 50 | 1100 |
| Example 9 | " | 100 | 1160 |
| Example 10 | " | 150 | 1260 |
| Example 11 | " | 200 | 1350 |
| Example 12 | " | 300 | 1380 |

EXAMPLES 13 TO 18 AND COMPARATIVE EXAMPLE 3

By means of the apparatus as shown in FIGS. 4 and 5, sputtering was sequentially conducted by using an aluminum substrate 3 and a chromium target and a Co-Cr-Ta alloy target under such condition that a potential (as identified in Table 3) relative to the substrate 3 was applied to the intermediate electrode 4 at the background pressure of at most $1 \times 10^{-6}$ Torr, at an argon gas pressure of $2 \times 10^{-3}$ Torr and at a substrate temperature of 250° C. to sequentially form a chromium layer (thickness: 1,000 Å) and an 86 atomic % Co-12 atomic % Cr-2 atomic % Ta magnetic layer (550 G·μm) on the substrate.

The coercive force of the magnetic disk thus obtained was measured by a sample vibrating type magnetometer, and the results are shown in Table 3.

TABLE 3

|  | Cr undercoating layer Voltage applied to intermediate electrode (V) | Co—Cr—Ta magnetic layer Voltage applied to intermediate electrode (V) | Br · t (G · μm) | Coercive force (Oe) |
| --- | --- | --- | --- | --- |
| Comparative Example 3 | 0 | 0 | 550 | 950 |
| Example 13 | 0 | 100 | " | 1160 |
| Example 14 | 100 | 100 | " | 1230 |
| Example 15 | 0 | 200 | " | 1350 |
| Example 16 | 200 | 200 | " | 1390 |
| Example 17 | 0 | 300 | " | 1380 |
| Example 18 | 300 | 300 | " | 1410 |

EXAMPLES 19 TO 24 AND COMPARATIVE EXAMPLE 4

Figure 6:
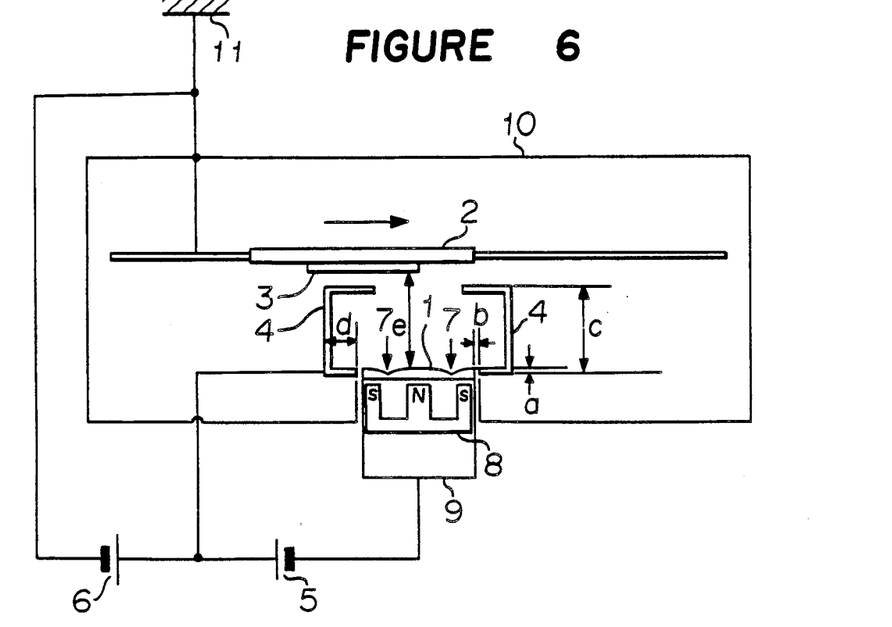

By means of the apparatus as shown in FIG. 6, sputtering was conducted by using an aluminum substrate 3 having a thin chromium layer (thickness: 1.000 Å) formed as the undercoating layer by sputtering and a Co-Cr-Ta alloy target 1 under such condition that a potential (as identified in Table 4), relative to the substrate 3 was applied to the intermediate electrode 4 at a background pressure of at most $1 \times 10^{-6}$ Torr, at an argon gas pressure of $2 \times 10^{-3}$ Torr and at a substrate temperature of 250° C., to form an 86 atomic % Co-12 atomic % Cr-2 atomic % Ta magnetic layer (550 G·μm) on the substrate.

The coercive force of the magnetic disk thus obtained was measured by a sample vibrating type magnetometer, and the results are shown in Table 4.

The position and the shape of the intermediate electrode were as follows:
 a=3 mm, b=5 mm, c=71 mm, d=100 mm, e=83 mm,
Shape: a shape to enclose the entire circumference of the target.

TABLE 4

|  | Magnetic layer | Voltage applied to intermediate electrode (V) | Coercive force (Oe) |
| --- | --- | --- | --- |
| Comparative Example 4 | Co$_{86}$—Cr$_{12}$—Ta$_2$ | 0 | 950 |
| Example 19 | " | 50 | 1140 |
| Example 20 | " | 100 | 1210 |
| Example 21 | " | 150 | 1280 |
| Example 22 | " | 200 | 1340 |
| Example 23 | " | 300 | 1400 |
| Example 24 | " | 400 | 1410 |

EXAMPLES 25 AND 26 AND COMPARATIVE EXAMPLE 5

Figure 7:
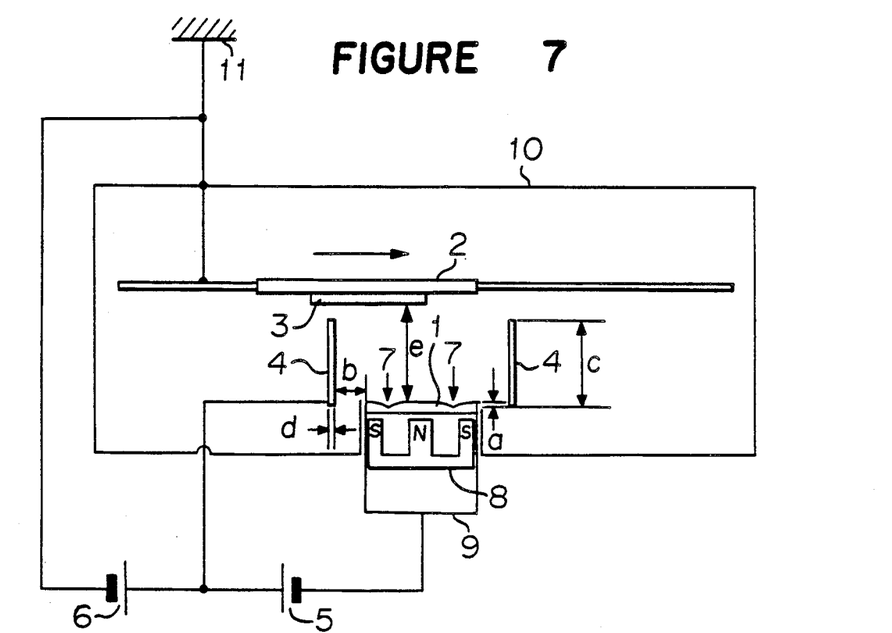

By means of the apparatus as shown in FIG. 7, sputtering was conducted by using an aluminum substrate 3 having a thin chromium layer (thickness: 1,000 Å) formed as the undercoating layer and a Co-Cr-Ta alloy target 1 under such condition that a potential (as identified in Table 5) was applied to the intermediate electrode 4 at a background pressure of at most $1 \times 10^{-6}$ Torr, at an argon gas pressure of $2 \times 10^3$ Torr and at a substrate temperature of 250° C., to form an 86 atomic % Co-12 atomic % Cr-2 atomic % Ta magnetic layer (550 G·μm) on the substrate.

The coercive force of the magnetic disk thus obtained was measured by a sample vibrating type magnetometer, and the results are shown in Table 5.

The position and shape of the intermediate electrode were as follows:
 a=3 mm, b=102 mm, c=58 mm, d=3 mm, e=83 mm,
Shape: a shape to enclose the entire circumference of the target.

TABLE 5

|  | Magnetic layer | Voltage applied to intermediate electrode (V) | Coercive force (Oe) |
| --- | --- | --- | --- |
| Comparative Example 5 | Co$_{86}$—Cr$_{12}$—Ta$_2$ | 0 | 950 |
| Example 25 | " | 100 | 1200 |
| Example 26 | " | 200 | 1290 |

EXAMPLES 27 AND 28 AND COMPARATIVE EXAMPLE 6

Figure 8:
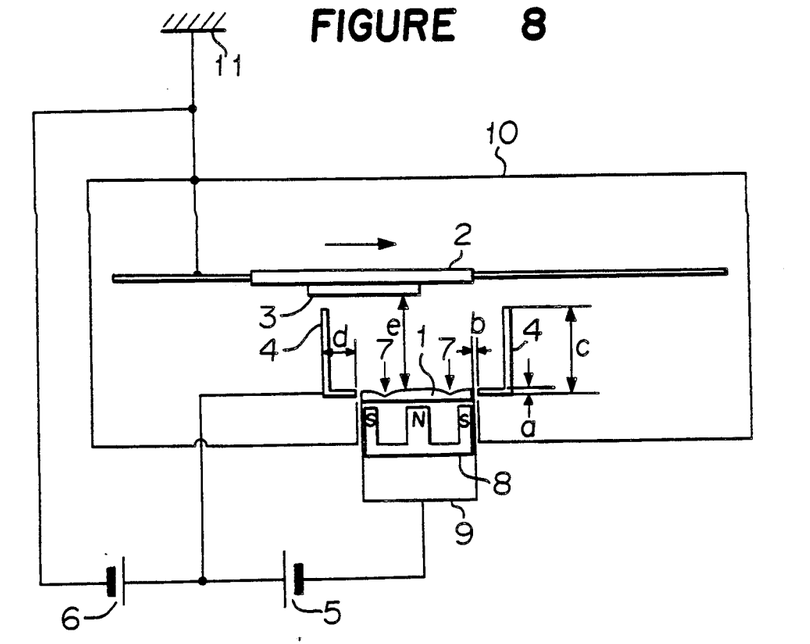

By means of the apparatus as shown in FIG. 8, sputtering was conducted by using an aluminum substrate 3 having a thin chromium layer (thickness: 1,000 Å) formed as the undercoating layer by sputtering and a Co-Cr-Ta alloy target 1 under such condition that a potential (as identified in Table 6) relative to the substrate 3 was applied to the intermediate electrode 4 at a background pressure of at most $1\times10^{-6}$ Torr, at an argon gas pressure of $2\times10^{-3}$ Torr and at a substrate temperature of 250° C., to form an 86 atomic % Co-12 atomic % Cr-2 atomic % Ta magnetic layer (550 G·μm) on the substrate.

The coercive force of the magnetic disk thus obtained was measured by a sample vibrating type magnetometer, and the results are shown in Table 6.

The position and the shape of the intermediate electrode were as follows:

a=3 mm, b=5 mm, c=58 mm, d=100 mm, e=83 mm,

Shape: a shape to enclose the entire circumference of the target.

TABLE 6

| | Magnetic layer | Voltage applied to intermediate electrode (V) | Coercive force (Oe) |
| --- | --- | --- | --- |
| Comparative Example 6 | $Co_{86}$—$Cr_{12}$—$Ta_2$ | 0 | 950 |
| Example 27 | " | 150 | 1260 |
| Example 28 | " | 200 | 1320 |

EXAMPLES 29 TO 31 AND COMPARATIVE EXAMPLE 7

Figure 9:
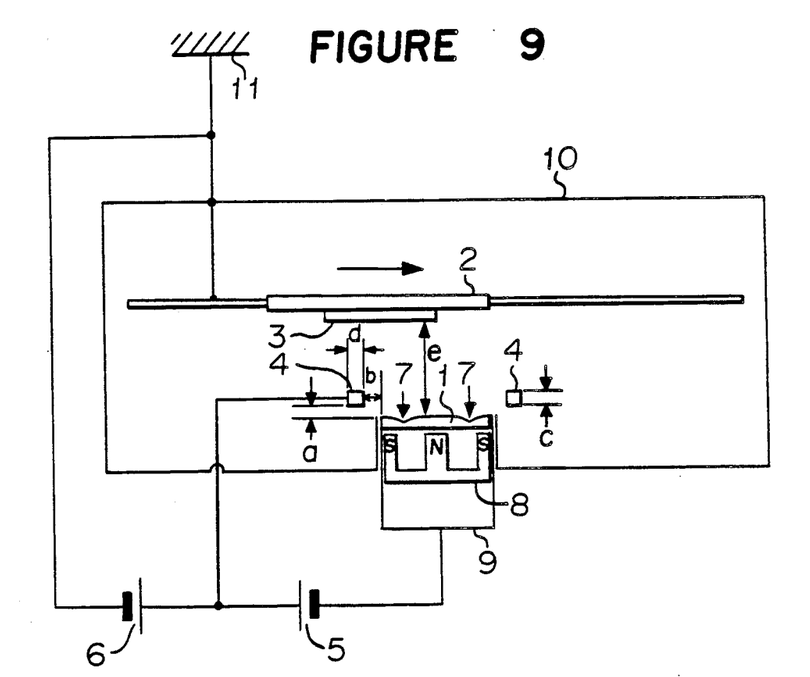

By means of the apparatus as shown in FIG. 9, sputtering was conducted by using an aluminum substrate 3 having a thin chromium layer (thickness: 1,000 Å) formed as the undercoating layer by sputtering and a Co-Cr-Ta alloy target 1 under such condition that a potential (as identified in Table 7) relative to the substrate 3 was applied to the intermediate electrode 4 at a background pressure of at most $1\times10^{-6}$ Torr, at an argon gas pressure of $2\times10^{-3}$ Torr and at a substrate temperature of 250° C., to form an 86 atomic % Co-12 atomic % Cr-2 atomic % Ta magnetic layer (550 G·μm) on the substrate.

The coercive force of the magnetic disk thus obtained was measured by a sample vibrating type magnetometer, and the results are shown in Table 7.

The position and the shape of the intermediate electrode were as follows:

a=17 mm, b=10 mm, c=13 mm, d=13 mm, e=83 mm,

Shape in Examples 29 and 30: a shape to enclose the entire circumference of the target, Shape in Example 31: a shape to enclose 60% of the circumference of the target.

TABLE 7

| | Magnetic layer | Voltage applied to intermediate electrode (V) | Coercive force (Oe) |
| --- | --- | --- | --- |
| Comparative Example 7 | $Co_{86}$—$Cr_{12}$—$Ta_2$ | 0 | 950 |
| Example 29 | " | 200 | 1150 |
| Example 30 | " | 300 | 1080 |
| Example 31 | " | 200 | 1050 |

EXAMPLE 32 AND COMPARATIVE EXAMPLE 8

Figure 10:
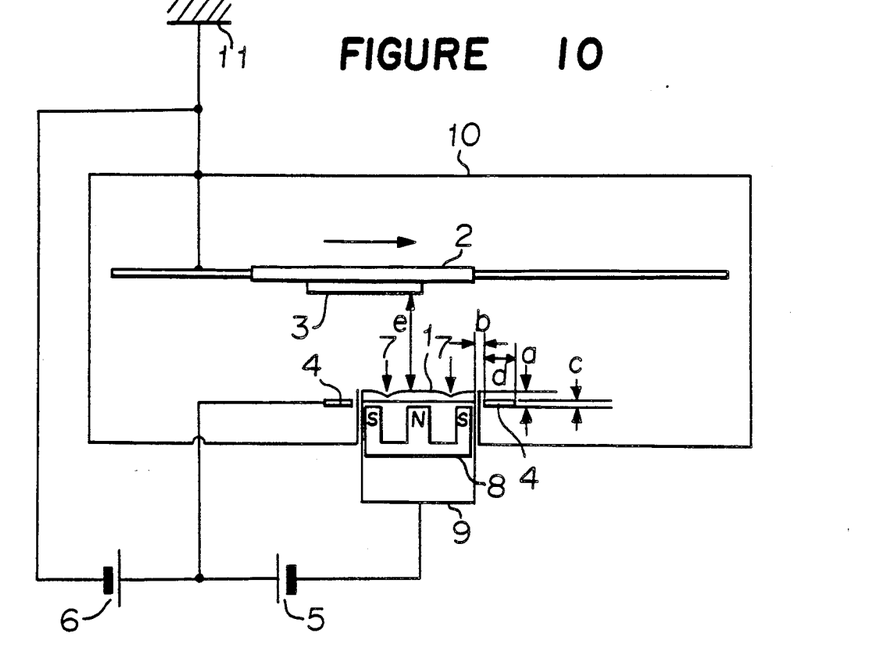

By means of the apparatus as shown in FIG. 10, sputtering was conducted by using an aluminum substrate 3 having a thin chromium layer (thickness: 1,000 Å) formed as the undercoating layer by sputtering and a Co-Cr-Ta alloy target 1 under such condition that a potential (as identified in Table 8) relative to the substrate 3 was applied to the intermediate electrode 4 at a background pressure of at most $1\times10^{-6}$ Torr, at an argon gas pressure of $2\times10^{-3}$ Torr and at a substrate temperature of 250° C., to form an 86 atomic % Co-12 atomic % Cr-2 atomic % Ta magnetic layer (550 G·μm) on the substrate.

The coercive force of the magnetic disk thus obtained was measured by a sample vibrating type magnetometer, and the results are shown in Table 8.

The position and the shape of the intermediate electrode were as follows:

a=13 mm, b=53 mm, c=3 mm, d=52 mm, e=83 mm,

Shape: a shape to enclose the entire lower circumference of the target.

TABLE 8

| | Magnetic layer | Voltage applied to intermediate electrode (V) | Coercive force (Oe) |
| --- | --- | --- | --- |
| Comparative Example 8 | $Co_{86}$—$Cr_{12}$—$Ta_2$ | 0 | 950 |
| Example 32 | " | 200 | 1300 |

COMPARATIVE EXAMPLES 9 AND 10

Figure 11:
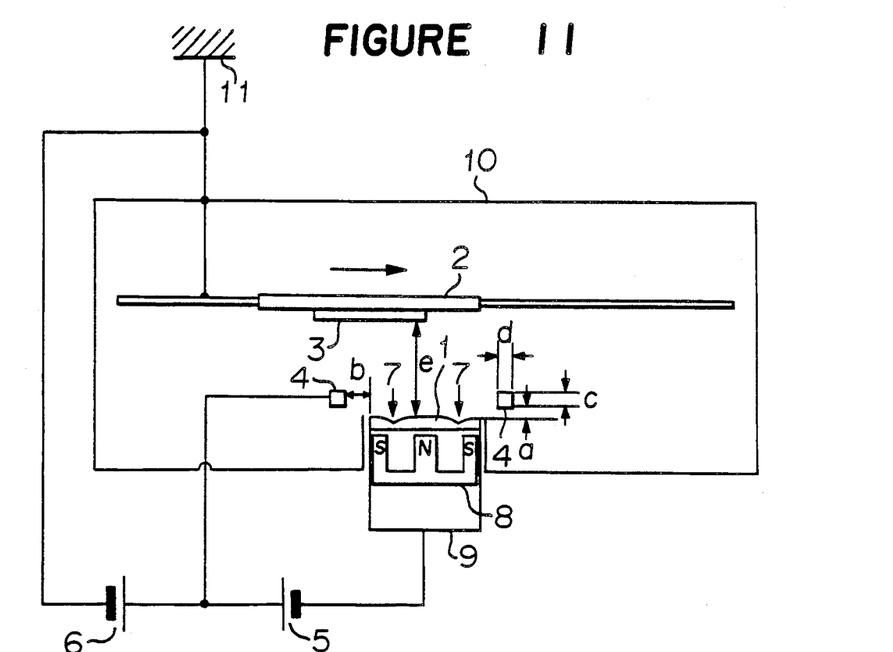

By means of the apparatus as shown in FIG. 11, sputtering was conducted by using an aluminum substrate 3 having a thin chromium layer (thickness: 1,000 Å) formed as the undercoating layer by sputtering and a Co Cr-Ta alloy target 1 under such condition that a potential (as identified in Table 9) relative to the substrate 3 was applied to the intermediate electrode 4 at a background pressure of at most $1\times10^{-6}$ Torr, at an argon gas pressure of $2\times10^{-3}$ Torr and at a substrate temperature of 250° C., to form an 86 atomic % Co-12 atomic % Cr-2 atomic % Ta magnetic layer (550 G·μm) on the substrate.

The coercive force of the magnetic disk thus obtained was measured by a sample vibrating type magnetometer, and the results are shown in Table 9.

The position and shape of the intermediate electrode were as follows:

a=17 mm, b=10 mm, c=13 mm, d=13 mm, e=83 mm,

Shape: a shape to enclose 30% of the circumference of the target.

TABLE 9

| Magnetic layer | Voltage applied to intermediate electrode (V) | Coercive force (Oe) |
|---|---|---|
| Comparative Example 9 | $Co_{86}$—$Cr_{12}$—$Ta_2$ | 0 | 950 |
| Comparative Example 10 | " | 200 | 990 |

EXAMPLES 33 TO 38 AND COMPARATIVE EXAMPLES 11 TO 15

By means of the apparatus as shown in FIGS. 4 and 5, sputtering was conducted by using an aluminum substrate 3 having a thin chromium layer (with a thickness as identified in Table 10) formed as the undercoating layer by sputtering and a Co-Cr-Ta alloy target 1 under such a condition that a potential (as identified in Table 10) relative to the substrate 3 was applied to the intermediate electrode 4 at a background pressure of at most $1 \times 10^{-6}$ Torr, at an argon gas pressure of $2 \times 10^{-3}$ Torr and at a substrate temperature of 250° C., to form an 86 atomic % Co-12 atomic % Cr-2 atomic % Ta magnetic layer (550 G·μm) on the substrate.

The coercive force of the magnetic disc thus obtained was measured by a sample vibrating type magnetometer, and the results are shown in Table 10.

EXAMPLES 39 AND 40 AND COMPARATIVE EXAMPLES 16 TO 22

A magnetic disk was prepared in the same manner as in Example 33 except that a Co-Ni-Cr alloy target was used instead of the Co-Cr-Ta alloy target and a 70 atomic % Co-20 atomic % Ni-10 atomic % Cr magnetic layer (550 G·μm) was formed on the substrate at the voltage as shown in Table 10. The coercive force was measured, and the results are shown in Table 10.

TABLE 10

| | Magnetic layer | Voltage applied to intermediate electrode (V) | Thickness of Cr undercoating layer (Å) | Coercive force (Oe) |
|---|---|---|---|---|
| Example 33 | $Co_{86}$—$Cr_{12}$—$Ta_2$ | +200 | 3000 | 1340 |
| Example 34 | " | " | 2000 | 1320 |
| Example 35 | " | " | 1000 | 1350 |
| Example 36 | " | " | 500 | 1290 |
| Example 37 | " | " | 250 | 1340 |
| Example 38 | " | " | 100 | 1160 |
| Comparative Example 11 | " | " | 0 | 390 |
| Comparative Example 12 | " | 0 | 2000 | 1000 |
| Comparative Example 13 | " | " | 1000 | 950 |
| Comparative Example 14 | " | " | 500 | 930 |
| Comparative Example 15 | " | " | 250 | 960 |
| Example 39 | $Co_{70}$—$Ni_{20}$—$Cr_{10}$ | +200 | 3000 | 1170 |
| Example 40 | " | " | 2000 | 1190 |
| Comparative Example 16 | " | " | 1000 | 960 |
| Comparative Example 17 | " | " | 500 | 710 |
| Comparative Example 18 | " | " | 250 | 790 |
| Comparative Example 19 | " | 0 | 2000 | 850 |
| Comparative Example 20 | " | " | 1000 | 750 |
| Comparative Example 21 | " | " | 500 | 780 |
| Comparative Example 22 | " | " | 250 | 720 |

EXAMPLES 41 AND 42 AND COMPARATIVE EXAMPLES 23 AND 24

By means of the apparatus as shown in FIGS. 4 and 5 sputtering was conducted by using an aluminum substrate 3 having a thin chromium layer (thickness: 2,000 Å) formed as the undercoating layer by sputtering and a cobalt alloy target 1 (having the composition as identified in Table 11) under such condition that a potential (as identified in Table 11) relative to the substrate 3 was applied to the intermediate electrode 4 at a background pressure of at most $1 \times 10^{-6}$ Torr, at an argon gas pressure of $2 \times 10^{-3}$ Torr and at a substrate temperature of 250° C., to form a magnetic layer (as identified in Table 11) (550 G·μm) on the substrate.

The coercive force of the magnetic disk thus obtained was measured by a sample vibrating type magnetometer, and the results are shown in Table 11.

TABLE 11

| | Target or Magnetic layer | Voltage applied to intermediate electrode (V) | Br.t (G·μm) | Coercive force (Oe) |
|---|---|---|---|---|
| Comparative Example 23 | $Co_{86}$—$Cr_{12}$—$Ta_2$ | 0 | 550 | 1000 |
| Example 41 | " | 200 | " | 1320 |
| Comparative Example 24 | $Co_{70}$—$Ni_{20}$—$Cr_{10}$ | 0 | " | 850 |
| Example 42 | " | 200 | " | 1190 |

EXAMPLES 43 TO 46 AND COMPARATIVE EXAMPLE 25

Figure 12:
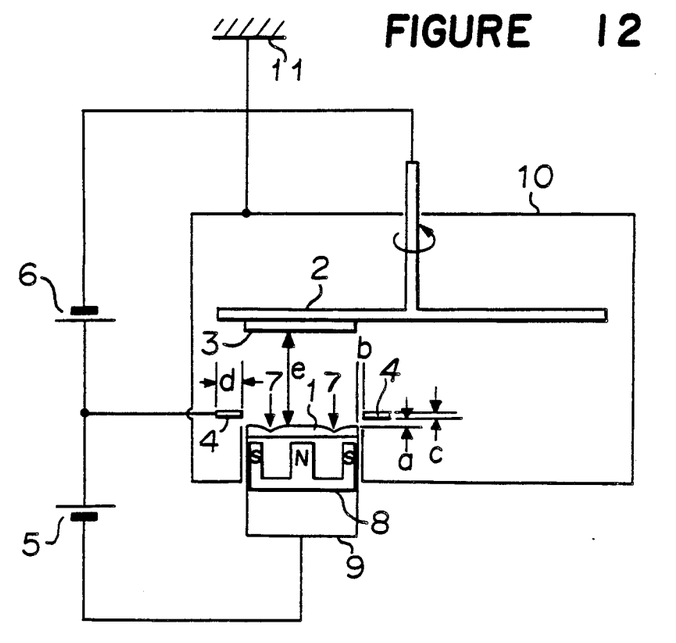

By means of the apparatus as shown in FIG. 12, sputtering was conducted by using an aluminum substrate 3 having a thin chromium layer (thickness: 2,000 Å) formed as the undercoating layer and a Co-Cr-Ta alloy target 1 under such condition that a potential (as identified in Table 12) was applied to the intermediate electrode 4 at a background pressure of at most $1 \times 10^{-6}$ Torr, at an argon gas pressure of $2 \times 10^{-3}$ Torr and at a substrate temperature of 250° C., to form an 86 atomic % Co-12 atomic % Cr-2 atomic % Ta magnetic layer (400 G·μm) on the substrate.

The coercive force of the magnetic disc thus obtained was measured by a sample vibrating type magnetometer, and the results are shown in Table 12.

The position and the shape of the intermediate electrode were as follows:

a=1 mm, b=1 mm, c=5 mm, d=56 mm, e=200 mm,

Shape: a shape to enclose the entire circumference of the target.

EXAMPLES 47 AND 48 AND COMPARATIVE EXAMPLES 26 AND 27

Sputtering was conducted in the same manner as in Example 43 except that the Co-Cr-Ta alloy was changed to a Co-Cr-Ag alloy or a Co-Ni-B alloy and the voltage applied to the intermediate electrode was changed as shown in Table 12. The results are shown in Table 12.

TABLE 12

|  | Magnetic layer | Voltage applied to intermediate electrode (V) | Coercive force (Oe) |
| --- | --- | --- | --- |
| Comparative Example 25 | $Co_{86}$—$Cr_{12}$—$Ta_2$ | 0 | 940 |
| Example 43 | " | 100 | 1380 |
| Example 44 | " | 200 | 1500 |
| Example 45 | " | 300 | 1550 |
| Example 46 | " | 400 | 1570 |
| Comparative Example 26 | $Co_{86}$—$Cr_9$—$Ag_5$ | 0 | 750 |
| Example 47 | " | 250 | 1100 |
| Comparative Example 27 | $Co_{67}$—$Ni_{30}$—$B_3$ | 0 | 890 |
| Example 48 | " | 250 | 1240 |

EXAMPLE 49 AND COMPARATIVE EXAMPLE 28

Figure 13:
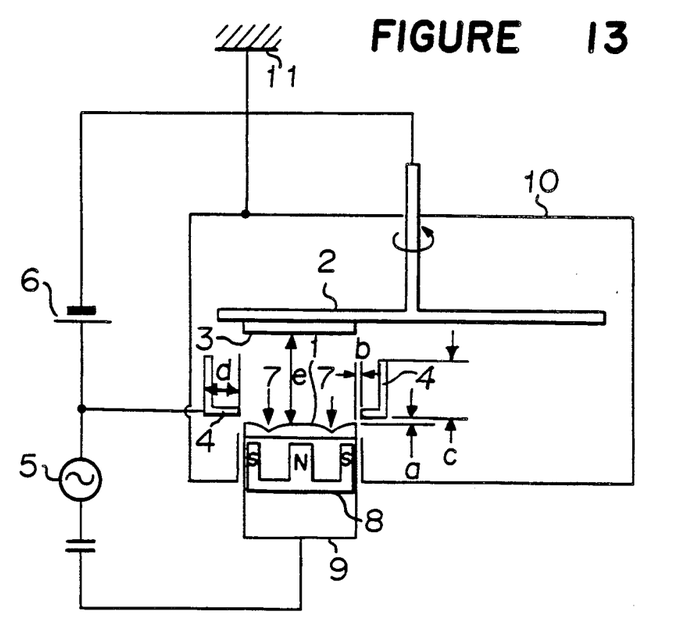

By means of the RF magnetron sputtering apparatus as shown in FIG. 13, sputtering was conducted by using an aluminum substrate 3 having a thin chromium layer (thickness: 2,000 Å) formed as the undercoating layer by sputtering and a Co-Cr-Ta alloy target 1 under such condition that a potential (as identified in Table 13) relative to the substrate 3 was applied to the intermediate electrode 4 at a background pressure of at most $1 \times 10^{-6}$ Torr, at an argon gas pressure of $2 \times 10^{-3}$ Torr and at a substrate temperature of 250° C., to form an 86 atomic % Co-12 atomic % cr-2 atomic % Ta magnetic layer (400 G·μm) on the substrate.

The coercive force of the magnetic disk thus obtained was measured by a sample vibrating type magnetometer, and the results are shown in Table 13.

The position and the shape of the intermediate electrode were as follows:

a=1 mm, b=1 mm, c=185 mm, d=56 mm, e=200 mm,

Shape: a shape to enclose the entire circumference of the target.

TABLE 13

|  | Magnetic layer | Voltage applied to intermediate electrode (V) | Coercive force (Oe) |
| --- | --- | --- | --- |
| Comparative Example 28 | $Co_{86}$—$Cr_{12}$—$Ta_2$ | 0 | 850 |
| Example 49 | " | 100 | 1210 |

EXAMPLES 50 TO 59 AND COMPARATIVE EXAMPLES 29 TO 32

By means of the apparatus as shown in FIGS. 14 and 15, sputtering was conducted by using an aluminum substrate 3 having a thin chromium layer (thickness: 2,000 Å) formed as the undercoating layer and a Co-Cr-Ta alloy target 1 under such condition that a potential (as identified in Table 14) was applied to the intermediate electrode 4 and a voltage from the bias power source 12 (as identified in Table 14) was applied to the substrate 3 at a background pressure of at most $1 \times 10^{-6}$ Torr, at an argon gas pressure of $2 \times 10^{-3}$ Torr and at a substrate temperature of 250° C., to form an 86 atomic % Co-12 atomic % Cr-2 atomic % Ta magnetic layer (400 G·μm) on the substrate.

The coercive force of the magnetic disk thus obtained was measured by a sample vibrating type magnetometer, and the results are shown in Table 14.

The position and the shape of the intermediate electrode were as follows:

a=1 mm, b=1 mm, c=5 mm, d=56 mm, e=200 mm,

Shape: a shape to enclose the entire circumference of the target.

TABLE 14

|  | Voltage applied to intermediate electrode (V) | Voltage applied from bias power source (V) | Coercive force (Oe) |
| --- | --- | --- | --- |
| Comparative Example 29 | 0 | 0 | 940 |
| Example 50 | 100 | 0 | 1380 |
| Example 51 | 200 | 0 | 1500 |
| Example 52 | 300 | 0 | 1550 |
| Example 53 | 400 | 0 | 1570 |
| Comparative Example 30 | 0 | −100 | 1380 |
| Example 54 | 100 | −100 | 1550 |
| Example 55 | 200 | −100 | 1590 |
| Example 56 | 300 | −100 | 1610 |
| Comparative Example 31 | 0 | −200 | 1560 |
| Example 57 | 100 | −200 | 1580 |
| Example 58 | 200 | −200 | 1600 |
| Comparative Example 32 | 0 | −300 | 1580 |
| Example 59 | 100 | −300 | 1600 |

What is claimed is:

1. A method for producing a magnetic recording medium, which comprises forming, by sputtering, a thin undercoating layer and a thin cobalt alloy magnetic layer sequentially on a substrate, wherein an intermediate electrode is provided in the vicinity of the target to enclose at least ½ of the circumference of the sputter erosion end of the target, and at least one of the undercoating layer and the cobalt alloy magnetic layer is formed under such condition that a positive potential relative to the substrate and the grounded portion of the main body of the layer-forming apparatus, is applied to the intermediate electrode.

2. The method according to claim 1, wherein at least a part of the intermediate electrode is located between a position distanced by ⅓ of the distance between the surface of the target and the surface of the substrate, from the surface of the target in a direction towards the substrate, and a position distanced by 30 mm from the surface of the target in a direction away from the substrate.

3. The method according to claim 1, wherein at least a part of the intermediate electrode is located between a position distanced by ¼ of the distance between the surface of the target and the surface of the substrate, from the surface of the target in a direction towards the substrate, and a position distanced by 20 mm from the surface of the target in a direction away from the substrate.

4. The method according to claim 1, wherein the intermediate electrode is located between the circumference of the sputter erosion end of the target and a position distanced by 200 mm from said circumference outwardly in the plane of the target.

5. The method according to claim 1, wherein the intermediate electrode is located between the circumference of the sputter erosion end or the target and a position distanced by 150 mm from said circumference outwardly in the plane of the target.

6. The method according to claim 1, wherein the intermediate electrode is located between the circumference of the target and a position distanced by 120 mm from said circumference outwardly in the plane of the target.

7. The method according to claim 1, wherein the undercoating layer is formed under said condition.

8. The method according to claim 1, wherein the cobalt alloy magnetic layer is formed under said condition.

9. The method according to claim 1, wherein the undercoating layer and the cobalt alloy magnetic layer are sequentially formed under said condition.

10. The method according to claim 1, wherein the undercoating layer is a thin chromium layer.

11. The method according to claim 1, wherein the cobalt alloy magnetic layer is a thin cobalt-chromium alloy magnetic layer.

12. The method according to claim 1, wherein the cobalt alloy magnetic layer is a thin cobalt-nickel alloy magnetic layer.

13. The method according to claim 1, wherein the cobalt alloy magnetic layer is a thin cobalt-chromium-tantalum alloy magnetic layer.

14. The method according to claim 1, wherein the undercoating layer is a chromium layer having a thickness of from 50 to 3,000 Å.

15. The method according to claim 1, wherein a positive potential of at most 1,000 V is applied to the intermediate electrode.

16. The method according to claim 1, wherein a positive potential of from 50 to 500 V is applied to the intermediate electrode.

17. The method according to claim 1, wherein a negative bias voltage relative to the rounded portion of the main body of the layer-forming apparatus is applied to the substrate.

18. The method according to claim 1, wherein a negative bias voltage of at most $-1,000$ V relative to the grounded portion of the main body of the layer-forming apparatus is applied to the substrate.

19. The method according to claim 1, wherein a negative bias voltage of from $-50$ to $-500$ V relative to the grounded portion of the main body of the layer-forming apparatus is applied to the substrate.

* * * * *